United States Patent
Uehara

(10) Patent No.: US 7,884,041 B2
(45) Date of Patent: Feb. 8, 2011

(54) OPTICAL GLASS

(75) Inventor: Susumu Uehara, Sagamihara (JP)

(73) Assignee: Ohara Inc., Sagamihara-shi (JP)

( * ) Notice: Subject to any disclaimer, the term of this patent is extended or adjusted under 35 U.S.C. 154(b) by 341 days.

(21) Appl. No.: 11/669,520

(22) Filed: Jan. 31, 2007

(65) Prior Publication Data

US 2007/0179038 A1    Aug. 2, 2007

(30) Foreign Application Priority Data

Feb. 2, 2006    (JP) ............................ 2006-025317

(51) Int. Cl.
C03C 3/066    (2006.01)
C03C 3/068    (2006.01)

(52) U.S. Cl. .......................... 501/78; 501/79

(58) Field of Classification Search ............ 501/79, 501/50, 78

See application file for complete search history.

(56) References Cited

U.S. PATENT DOCUMENTS

| | | | | |
|---|---|---|---|---|
| 3,811,901 A * | 5/1974 | Bacon | ........................ | 501/38 |
| 4,084,978 A * | 4/1978 | Sagara | ......................... | 501/63 |
| 4,742,028 A * | 5/1988 | Boudot et al. | ................. | 501/78 |
| 6,413,894 B1 * | 7/2002 | Sato | ............................ | 501/77 |
| 6,645,894 B2 * | 11/2003 | Endo | .......................... | 501/51 |
| 6,713,419 B1 * | 3/2004 | Onozawa et al. | ............. | 501/78 |
| 6,753,278 B2 * | 6/2004 | Wolff et al. | ................... | 501/51 |
| 6,753,281 B2 * | 6/2004 | Uehara | ........................ | 501/78 |
| 6,797,659 B2 * | 9/2004 | Uehara | ........................ | 501/78 |
| 6,844,279 B2 * | 1/2005 | Hayashi et al. | ............... | 501/50 |
| 6,977,232 B2 * | 12/2005 | Hayashi et al. | ............... | 501/79 |
| 2009/0062101 A1 * | 3/2009 | Uehara | ........................ | 501/53 |

* cited by examiner

Primary Examiner—Karl E Group
Assistant Examiner—Elizabeth A Bolden
(74) Attorney, Agent, or Firm—Westerman, Hattori, Daniels & Adrian, LLP

(57) ABSTRACT

An optical glass has optical constants of a refractive index (nd) within a range from 1.73 to less than 1.80 and an Abbe number (vd) within a range from 43 to 55, comprises $SiO_2$, $B_2O_3$, $Y_2O_3$, $La_2O_3$, ZnO and $Li_2O$ as essential components, is substantially free of lead component, arsenic component and fluorine component, has a ratio of $SiO_2/B_2O_3$ of 0.30 to 1.55 and a ratio of $Y_2O_3/La_2O_3$ of 0.15 to 1.00, and has a glass transition temperature (Tg) of 620° C. or below.

10 Claims, No Drawings

US 7,884,041 B2

OPTICAL GLASS

BACKGROUND OF THE INVENTION

This invention relates to an optical glass and, more particularly, to an optical glass having a low glass transition temperature (Tg) and high refractive index and low dispersion characteristics, being light and suitable for precision press molding.

There are spherical lenses and aspherical lenses as lenses used for constituting an optical system. Many spherical lenses are produced by lapping and polishing glass pressings obtained by reheat press molding glass materials. On the other hand, aspherical lenses are mainly produced by precision press molding, i.e., the method according to which lens preforms which have been softened by heating are press molded with a mold having a high precision molding surface and the shape of the high precision molding surface of the mold is transferred to the lens preforms.

In obtaining glass moldings such as aspherical lenses by precision press molding, it is necessary to press lens preforms which have been softened by heating in a high temperature environment for transferring the shape of the high precision molding surface of the mold to the lens preforms and, therefore, the mold used for such precision press molding is subjected to a high temperature and, moreover, a high pressing force is applied to the mold. Hence, in heating and softening the lens preforms and press molding the lens preforms, the molding surface of the mold tends to be oxidized or eroded, or a release film provided on the molding surface tends to be damaged with the result that the high precision molding surface of the mold cannot be maintained or the mold itself tends to be damaged. In such a case, the mold must be replaced and, as a result, frequency of replacement of the mold increases and production of products at a low cost in a large scale thereby cannot be achieved. Accordingly, glasses used for precision press molding are desired to have the lowest possible glass transition temperature (Tg) from the standpoint of preventing such damage to the mold, maintaining the high precision molding surface of the mold for a long period of time and enabling precision press molding at a low pressing force.

In conducting precision press molding, the glass of a lens preform needs to have a mirror surface or a surface close to a mirror surface. A lens preform generally is either produced directly from molten glass by the dripping method or produced by lapping and polishing glass pieces. In case of producing a lens preform by lapping and polishing, since the surface portion of a glass is scraped off, piece and the glass piece can be used without any particular problem even if there is a defect in appearance such as devitrification which occurs in the surface portion only of the glass piece. Such lens preform made by lapping and polishing includes, for example, a lens preform made by lapping and polishing the surface of a reheat press product, and a lens preform processed to a spherical shape having very little deviation from true sphere.

An optical system which uses such optical glass is mounted on an optical product such as digital cameras. Conforming to recent tendency towards compact and light design, there is a demand for a light lens also in lenses constituting an optical system.

For these reasons, from the point of view of utility for optical design, there has been a strong demand for an optical glass having high refractive index and low dispersion characteristics, a low glass transition temperature (Tg) and a light weight.

There has particularly been a strong demand for a high refractive index and low dispersion optical glass having optical constants of refractive index (nd) within a range from 1.73 to less than 1.80 and Abbe number (vd) within a range from 43 to 55.

Since a high refractive index and low dispersion optical glass is very useful in the optical design, various glasses of this type have for a long time been proposed.

Japanese Patent Application Laid-open Publications No. 2002-249337 discloses an optical glass having refractive index within a range from 1.72 to 1.83 and Abbe number within a range from 45 to 55. The optical glass disclosed in this publication, however, comprises $La_2O$ and $Gd_2O_3$ as main components and does not comprise $Y_2O_3$ and, therefore, it has large specific gravity with resulting difficulty in realizing a compact and light design. Further, optical glasses described as examples of this publication have excessively high glass transition temperatures and, therefore, these optical glasses are not suitable for precision press molding.

Japanese Patent Application Laid-open Publication No. 2003-201143 discloses an optical glass having refractive index within a range from 1.75 to 1.85 and Abbe number within a range from 40 to 55. The optical glass disclosed in this publication, however, comprises $La_2O$ and $Gd_2O_3$ as main components and does not comprise $Y_2O_3$ and, therefore, it has large specific gravity with resulting difficulty in realizing a compact and light design.

Further, in the optical glasses specifically disclosed in these publications which satisfy the above described optical constants, the ratio of $SiO_2/B_2O_3$ in weight % is outside of the range from 0.30 to 1.55 and the ratio of $Y_2O_3/La_2O_3$ in weight % is outside of the range from 0.15 to 1.00 and, for this reason, fail to satisfy desirable properties of the optical glass of the present invention which will be described below.

It is, therefore, an object of the present invention to provide an optical glass which has comprehensively eliminated the above described drawbacks of the prior art optical glasses and has the above described optical constants, a low glass transition temperature (Tg) and a light weight and therefore is suitable for precision press molding.

SUMMARY OF THE INVENTION

Studies and experiments made by the inventor of the present invention for achieving the above described object of the invention have resulted in the finding, which has led to the present invention, that by adopting a composition comprising specific amounts of $SiO_2$, $B_2O_3$, $Y_2O_3$, $La_2O_3$, ZnO and $Li_2O$, an optical glass having the above described optical constants, a low glass transition temperature (Tg), a light weight, and being suitable for precision press molding can be obtained.

Further, the inventor has found that, for realizing a light weight while maintaining desired optical constants, it is preferable for the optical glass to contain specific amounts of $Y_2O_3$ and $La_2O_3$ and it is particularly preferable for the optical glass to have a specific ratio of $SiO_2/B_2O_3$ and a specific ratio of $Y_2O_3/La_2O_3$ for imparting the optical glass with properties which enables a stable production and have high resistance to devitrification.

For achieving the above described object of the invention, in the first aspect of the invention, there is provided an optical glass having optical constants of a refractive index (nd) within a range from 1.73 to less than 1.80 and an Abbe number (vd) within a range from 43 to 55, comprising $SiO_2$, $B_2O_3$, $Y_2O_3$, $La_2O_3$, ZnO and $Li_2O$ as essential components, being substantially free of lead component, arsenic component and fluorine component, having a ratio of $SiO_2/B_2O_3$ of 0.30 to 1.55 and a ratio of $Y_2O_3/La_2O_3$ of 0.15 to 1.00, and having a glass transition temperature (Tg) of 620° C. or below.

In the second aspect of the invention, there is provided an optical glass as defined in the first aspect which comprises, in mass % on oxide basis, more than 1% $Li_2O$ and has a glass transition temperature (Tg) of 570° C. or below.

In the third aspect of the invention, there is provided an optical glass as defined in the first or second aspect which comprises, in mass % on oxide basis, more than 5% of $Y_2O_3$ and 10% or over of $La_2O_3$, and has specific gravity of 4.5 or below.

In the fourth aspect of the invention, there is provided an optical glass comprising in mass % on oxide basis:

| | |
|---|---|
| $SiO_2$ | more than 5% and 20% or below |
| $B_2O_3$ | 5–less than 25% |
| $Y_2O_3$ | more than 5% and 35% or below |
| $La_2O_3$ | 10–50% |
| ZnO | more than 5% and less than 25% and |
| $Li_2O$ | more than 1% and 6% or below and |
| $Gd_2O_3$ | 0–20% and/or |
| $Yb_2O_3$ | 0–20% and/or |
| $ZrO_2$ | 0–10% and/or |
| $Ta_2O_5$ | 0–less than 8% and/or |
| $WO_3$ | 0–less than 5.5% and/or |
| $Sb_2O_3$ | 0–1%. |

In the fifth aspect of the invention, there is provided an optical glass as defined in any of the first to third aspects comprising in mass % on oxide basis:

| | |
|---|---|
| $SiO_2$ | more than 5% and 20% or below and/or |
| $B_2O_3$ | 5–less than 25% and/or |
| $Y_2O_3$ | more than 5% and 35% or below and/or |
| $La_2O_3$ | 10–50% and/or |
| ZnO | more than 5% and less than 25% and/or |
| $Li_2O$ | more than 1% and 6% or below and/or |
| $Gd_2O_3$ | 0–20% and/or |
| $Yb_2O_3$ | 0–20% and/or |
| $ZrO_2$ | 0–10% and/or |
| $Ta_2O_5$ | 0–less than 8% and/or |
| $WO_3$ | 0–less than 5.5% and/or |
| $Sb_2O_3$ | 0–1%. |

In the sixth aspect of the invention, there is provided an optical glass as defined in any of the first to fifth aspect of the invention further comprising in mass % on oxide basis:

| | |
|---|---|
| $Na_2O$ | 0–5% and/or |
| $K_2O$ | 0–5% and/or |
| MgO | 0–5% and/or |
| CaO | 0–less than 15% and/or |
| SrO | 0–10% and/or |
| BaO | 0–15% and/or |
| $GeO_2$ | 0–5% and/or |
| $Al_2O_3$ | 0–5% and/or |
| $TiO_2$ | 0–less than 3% and/or |
| $Nb_2O_5$ | 0–less than 3% and/or |
| $Bi_2O_3$ | 0–less than 10%. |

In the seventh aspect of the invention, there is provided an optical glass as defined in any of the first to sixth aspects having liquidus temperature of 1160° C. or below and log η which is logarithm of viscosity (dPa·s) at liquidus temperature is within a range from 0.3 to 2.0.

In the eighth aspect of the invention, there is provided a lens preform made of an optical glass as defined in any of the first to seventh aspects.

In the ninth aspect of the invention, there is provided an optical element made by precision press molding a lens preform as defined in the eighth aspect.

In the tenth aspect of the invention, there is provided an optical element made by precision press molding an optical glass as defined in any of the first to seventh aspects.

DETAILED DESCRIPTION OF THE INVENTION

Description will be made about components which the optical glass of the present invention can comprise. Unless otherwise described, the composition ratio of each component will be expressed in mass %.

$SiO_2$ is an indispensable component which is very effective for increasing viscosity of the glass and improving resistance to devitrification and chemical durability of the glass. If, however, the amount of this component is insufficient, these effects cannot be achieved sufficiently whereas if the amount of this component is excessively large, the glass transition temperature (Tg) rises and the melting property of the glass is deteriorated. Therefore, the lower limit of the amount of this component should preferably be more than 5%, more preferably 5.1% and, most preferably be 5.5% and the upper limit of the amount of this component should be 20%, more preferably 18% and, most preferably be 15%. $SiO_2$ can be incorporated in the glass by using, e.g., $SiO_2$ as a raw material.

In the optical glass of the present invention which is a lanthanum glass, $B_2O_3$ is an indispensable component as a glass forming oxide. If, however, the amount of this component is insufficient, resistance to devitrification becomes insufficient whereas if the amount of this component excessively large, refractive index becomes low to the degree that it will deviate from the target optical constants and chemical durability is also deteriorated. Therefore, the lower limit of the amount of this component should preferably be 5%, more preferably 8% and, most preferably be 10% and the upper limit of this component should preferably be less than 25%, more preferably 22% and, most preferably be less than 20%. $B_2O_3$ can be incorporated in the glass by using, e.g., $H_3BO_3$ or $B_2O_3$ as a raw material.

$Y_2O_3$ is an indispensable component for realizing a light weight in the glass of the present invention which has high refractive-low dispersion characteristics, for it is effective for increasing refractive index and realizing low dispersion. If, however, the amount of this component is insufficient, it becomes difficult to maintain the optical constants within the above described ranges whereas if the amount of this component excessively large, resistance to devitrification is deteriorated. Therefore, the lower limit of the amount of this component should preferably be more than 5%, more preferably 6% and, most preferably be 10% and the upper limit of the amount of this component should be 35%, more preferably 30% and, most preferably be 25%. $Y_2O_3$ can be incorporated in the glass by using, e.g., $Y_2O_3$ as a raw material.

$La_2O_3$ is an indispensable component which is effective for increasing refractive index and lowering dispersion. If, however, the amount of this component is insufficient, it is difficult to maintain the optical constants within the above described values whereas if the amount of this component is excessively large, resistance to devitrification is deteriorated. Therefore, the lower limit of the amount of this component should preferably be 10%, more preferably 15% and, most preferably be 20% and the upper limit of the amount of this component should preferably be 50%, more preferably 45% and, most preferably be 40%. $La_2O_3$ can be incorporated in the glass by using, e.g., $La_2O_3$, lanthanum nitrate or its hydrate as a raw material.

ZnO is an indispensable component which is effective for lowering the glass transition temperature (Tg). If, however, the amount of this component is insufficient, this effect cannot be achieved sufficiently whereas if the amount of this component is excessively large, resistance to devitrification is deteriorated. Therefore, lower limit of the amount of this component should preferably be more than 5%, more preferably more than 8% and, most preferably be 12% and the upper limit of the amount of this component should preferably be less than 25%, more preferably 23% and, most preferably be 20%. ZnO can be incorporated in the glass by using, e.g., ZnO as a raw material.

$Li_2O$ is an indispensable component which is effective for lowering the glass transition temperature (Tg) substantially and facilitating melting of mixed glass materials. If, however, the amount of this component is insufficient, these effects cannot be achieved sufficiently whereas if the amount of this component is excessively large, resistance to devitrification is sharply deteriorated. Therefore, the lower limit of the amount of this component should preferably be more than 1%, more preferably be 1.5% and most preferably be more than 2% and the upper limit of the amount of this component should preferably be 6%, more preferably 5% and, most preferably be 4%. $Li_2O$ can be incorporated in the glass by using, e.g., $Li_2O$, $Li_2CO_3$, LiOH or $LiNO_3$ as a raw material.

$Gd_2O_3$ is effective for increasing refractive index and lowering dispersion. If, however, the amount of this component is excessively large, resistance to devitrification and chemical durability are deteriorated. Therefore, the upper limit of the amount of this component should preferably be 20%, and more preferably be less than 3%, and most preferably, this component should not be substantially added. $Gd_2O_3$ can be incorporated in the glass by using, e.g., $Gd_2O_3$ as a raw material.

$Yb_2O_3$ is effective for increasing refractive index and lowering dispersion. If, however, the amount of this component is excessively large, resistance to devitrification and chemical durability are deteriorated. Therefore, the upper limit of the amount of this component should preferably be 20%, more preferably 10% and, most preferably, be 5%. $Yb_2O_3$ can be incorporated in the glass by using, e.g., $Yb_2O_3$ as a raw material.

$ZrO_2$ is effective for adjusting optical constants, improving resistance to devitrification and improving chemical durability. If, however, the amount of this component is excessively large, resistance to devitrification is deteriorated and it becomes difficult to maintain the glass transition temperature (Tg) at a desired low temperature. Therefore, the upper limit of the amount of this component should preferably be 10%, more preferably 6% and, most preferably be 5%. $ZrO_2$ can be incorporated in the glass by using, e.g., $ZrO_2$ as a raw material.

$Ta_2O_5$ is effective for increasing refractive index and, improving chemical durability and resistance to devitrification. If, however, the amount of this component is excessively large, it becomes difficult to maintain the above described optical constants. Therefore, the upper limit of the amount of this component should preferably be less than 8%, more preferably 5% and, most preferably be 4%. $Ta_2O_5$ can be incorporated in the glass by using, e.g., $Ta_2O_5$ as a raw material.

$WO_3$ is effective for adjusting optical constants and improving resistance to devitrification. If, however, the amount of this component is excessively large, resistance to devitrification and transmittance in the short wavelength region of the visible ray region are deteriorated. Therefore, the upper limit of the amount of this component should preferably be less than 5.5%, more preferably less than 4% and, most preferably, be 2%. $WO_3$ can be incorporated in the glass by using, e.g., $WO_3$ as a raw material.

$Sb_2O_3$ may be optionally added for defoaming during melting of the glass. If the amount of this component is excessive, transmittance in the short-wave region of the visible ray region is deteriorated. Therefore, the upper limit of the amount of this component should preferably be 1%, more preferably 0.5% and, most preferably, be 0.1%.

$TiO_2$ is effective for adjusting optical constants and improving resistance to devitrification. If, however, the amount of this component is excessively large, resistance to devitrification decreases rather than increases and transmittance in the short-wave region of the visible ray region is deteriorated. Therefore the upper limit of the amount of this component should preferably be less than 3%, more preferably 2% and, most preferably be less than 1%. $TiO_2$ can be incorporated in the glass by using, e.g., $TiO_2$ as a raw material.

$Nb_2O_5$ is effective for increasing refractive index and improving chemical durability and resistance to devitrification. If, however, the amount of this component is excessively large, resistance to devitrification decreases rather than increases and transmittance in the short-wave region of the visible ray region is deteriorated. Therefore, the upper limit of the amount of this component should preferably be less than 3%, more preferably 2% and, most preferably, be 1%. $Nb_2O_5$ can be incorporated in the glass by using, e.g., $Nb_2O_5$ as a raw material.

$Bi_2O_3$ is effective for increasing refractive index. If, however, the amount of this component is excessively large, resistance to devitrification tends to decreases. Therefore, the upper limit of the amount of this component should preferably be less than 10%, more preferably 5% and, most preferably, be 3%. $Bi_2O_3$ can be incorporated in the glass by using, e.g., $Bi_2O_3$ as a raw material.

$Na_2O$ is effective for lowering glass transition temperature (Tg). If, however, the amount of this component is excessively large, resistance to devitrification tends to decreases. Therefore, the upper limit of the amount of this component should preferably be 5%, more preferably 3% and, most preferably, be 1%. $Na_2O$ can be incorporated in the glass by using, e.g., $Na_2O$, $Na_2CO_3$, NaOH and $NaNO_3$ as a raw material.

$K_2O$ is effective for lowering glass transition temperature (Tg). If, however, the amount of this component is excessively large, resistance to devitrification tends to decreases. Therefore, the upper limit of the amount of this component should preferably be 5%, more preferably 3% and, most preferably, be 1%. $K_2O$ can be incorporated in the glass by using, e.g., $K_2O$, $K_2CO_3$, KOH and $KNO_3$ as a raw material.

MgO is effective for adjusting optical constants. If, however, the amount of this component is excessively large, resistance to devitrification tends to decrease. Therefore, the upper limit of the amount of this component should preferably be 5%, more preferably 3% and, most preferably, be 1%. MgO can be incorporated in the glass by using, e.g., MgO or its carbonate, nitrate or hydroxide as a raw material.

CaO is effective for adjusting optical constants. If, however, the amount of this component is excessively large, resistance to devitrification tends to decrease. Therefore, the upper limit of the amount of this component should preferably be less than 15%, more preferably 10% and, most preferably, be 5%. CaO can be incorporated in the glass by using, e.g., CaO or its carbonate, nitrate or hydroxide as a raw material.

SrO is effective for adjusting optical constants. If, however, the amount of this component is excessively large, resistance to devitrification tends to decrease. Therefore, the upper limit of the amount of this component should preferably be 10%, more preferably 5% and, most preferably, be 3%. SrO can be incorporated in the glass by using, e.g., SrO or its carbonate, nitrate or hydroxide as a raw material.

BaO is effective for adjusting optical constants. If, however, the amount of this component is excessively large, resistance to devitrification tends to decrease. Therefore, the upper limit of the amount of this component should preferably be 15%, more preferably 10% and, most preferably, be 5%. BaO can be incorporated in the glass by using, e.g., BaO or its carbonate, nitrate or hydroxide as a raw material.

$GeO_2$ is effective for increasing refractive index and improving resistance to devitrification. Since, however, this component is very expensive, the upper limit of the amount of this component should preferably be 5%, more preferably 3% and, most preferably, be 1%. $GeO_2$ can be incorporated in the glass by using, e.g., $GeO_2$ as a raw material.

$Al_2O_3$ is effective for improving chemical durability. If the amount of this component is excessively large, resistance to devitrification is deteriorated. Therefore, the upper limit of this component should preferably be 5%, more preferably 3% and, most preferably, be 1%. $Al_2O_3$ can be incorporated in the glass by using, e.g., $Al_2O_3$ or $Al(OH)_3$.

$TeO_2$ is effective for increasing refractive index but there is likelihood that, when glass materials are melted in a platinum crucible or a melting furnace which is formed with platinum in a portion which comes into contact with molten glass, tellurium of $TeO_2$ is alloyed with platinum and heat resisting property of the alloyed portion is deteriorated with resulting making of a hole in the alloyed portion and leakage of the molten glass from the hole. The upper limit of the amount of $TeO_2$ therefore should preferably be 8%, more preferably 5% and, most preferably, be 3%. $TeO_2$ can be incorporated in the glass by using, e.g., $TeO_2$ as a raw material.

$Ga_2O_3$ is effective for increasing refractive index. Since, however, this component is very expensive, the upper limit of the amount of this component should preferably be 1%, more preferably 0.5% and, most preferably, be 0.1%. $Ga_2O_3$ can be incorporated in the glass by using, e.g., $Ga_2O_3$ as a raw material.

The above described raw materials used in the respective components of the glass have been cited for illustrative purpose only and raw materials which can be used for the glass of the present invention are not limited to the above described oxides etc. but can be selected from known materials in accordance with various modifications of manufacturing conditions for manufacturing the glass.

The inventor of the present invention has found that, by adjusting the ratio of amounts of $SiO_2$ to $B_2O_3$ to a predetermined range, liquidus temperature and devitrification appearing on the surface of the glass can be properly controlled at a low specific gravity. More specifically, the lower limit of the ratio of $SiO_2/B_2O_3$ should preferably be 0.3, more preferably 0.35 and, most preferably be 0.4 and the upper limit of this ratio should preferably be 1.55, more preferably 1.30 and, most preferably, be 1.26.

The inventor of the present invention has also found that, by adjusting the ratio of amounts of $Y_2O_3$ to $La_2O_3$ to a predetermined range, liquidus temperature and devitrification appearing on the surface of the glass can be properly controlled at a low specific gravity. More specifically, the lower limit of the ratio of $Y_2O_3/La_2O_3$ should preferably be 0.15, more preferably 0.20 and, most preferably be 0.26 and the upper limit of this ratio should preferably be 1.00, more preferably 0.90 and, most preferably, be 0.80.

Further, for maintaining desired optical constants and controlling liquidus temperature and devitrification appearing on the surface of the glass properly at a low specific gravity, it is preferable for the glass to have the above described preferable predetermined ranges of the ratios of $SiO_2/B_2O_3$ and $Y_2O_3/La_2O_3$ simultaneously.

The control of liquidus temperature and devitrification appearing on the surface of the glass will now be explained. In producing an optical glass, a formed product having little or no defect can be obtained when viscosity of the glass is within a certain range. Since a lanthanum glass generally has a low viscosity, liquidus temperature is lowered to increase viscosity and thereby facilitate production of the optical glass. On the other hand, there is glass in which devitrification tends to appear on the surface of the glass regardless of liquidus temperature. For example, devitrification occurs on the surface of glass made in the form of a sheet. Accordingly, a state in which liquidus temperature is low and devitrification does not occur on the surface of the glass is the most preferable state. In the present invention, there is a conflicting relation in that devitrification tends to occur on the surface of the glass when liquidus temperature is low and, conversely, devitrification is not likely to occur on the surface of the glass when liquidus temperature is high. An optical glass which satisfies both requirements of liquidus temperature and resistance to devitrification has been found to be realized only in the above described restricted ranges of the ratios of $SiO_2/B_2O_3$ and $Y_2O_3/La_2O_3$. As described above, in a case where devitrification occurs only on the uppermost surface of the glass, it can be used as an optical glass.

The glass may comprise $Lu_2O_3$, $Hf_2O_3$, $SnO_2$ and BeO. Since $Lu_2O_3$ and $Hf_2O_3$ are expensive materials, use of these components increases the manufacturing cost and it is not practical to use these components in commercial production. As to $SnO_2$, there is likelihood that, when glass materials are melted in a platinum crucible or a melting furnace which is formed with platinum in a portion which comes into contact with molten glass, tin of $SnO_2$ is alloyed with platinum and heat resisting property of the alloyed portion is deteriorated with resulting making of a hole in the alloyed portion and leakage of the molten glass from the hole. BeO has the problem that it adversely affects the environment and therefore imposes a heavy burden to the environment. Accordingly, the upper limit of the amount of each of these components should preferably be less than 0.1%, more preferably 0.05% and, most preferably these components should not be added at all.

Description will now be made about components which the optical glass of the present invention should not comprise.

Fluorine causes occurrence of striae due to evaporation in the production of a gob for a lens preform and therefore makes it difficult to produce a gob. Fluorine therefore should not be added to the optical glass of the present invention.

A lead compound not only has the problem that it tends to be fused with the mold during precision press molding, has the problem that steps must be taken for protecting the environment not only in production of the glass but also in cold processing such as polishing and waste of the glass and therefore it imposes a heavy burden to the environment. The lead compound therefore should not be added to the optical glass of the present invention.

$As_2O_3$, cadmium and thorium adversely affect the environment and therefore impose a heavy burden to the environment. These components therefore should not be added to the optical glass of the present invention.

$P_2O_5$ tends to deteriorate resistance to devitrification when it is added to the glass and, therefore, it is not preferable to add $P_2O_5$ to the optical glass of the present invention.

The optical glass of the present invention should preferably not comprise coloring components such as V, Cr, Mn, Fe, Co, Ni, Cu, Mo, Eu, Nd, Sm, Tb, Dy and Er. That is to say, these coloring components should not be intentionally added except for a case where these components are mixed as impurities.

Since the glass composition of the present invention is expressed in mass %, it cannot be directly expressed in mol %. A composition expressed in mol % of respective oxides existing in the glass composition satisfying the properties required by the present invention generally assumes the following values:

| | |
|---|---|
| $SiO_2$ | 10–40% |
| $B_2O_3$ | 8–40% |
| $Y_2O_3$ | 2–18% |
| $La_2O_3$ | 3–16% |
| ZnO | 7–35% and |
| $Li_2O$ | 4–24% and |
| $Gd_2O_3$ | 0–7% and/or |
| $Yb_2O_3$ | 0–7% and/or |
| $ZrO_2$ | 0–10% and/or |
| $Ta_2O_5$ | 0–2% and/or |
| $WO_3$ | 0–3% and/or |
| $Sb_2O_3$ | 0–1% |
| $Na_2O$ | 0–10% and/or |
| $K_2O$ | 0–10% and/or |
| MgO | 0–5% and/or |
| CaO | 0–10% and/or |
| SrO | 0–10% and/or |
| BaO | 0–15% and/or |
| $GeO_2$ | 0–3% and/or |
| $Al_2O_3$ | 0–5% and/or |
| $TiO_2$ | 0–less than 3% and/or |
| $Nb_2O_5$ | 0–2% and/or |
| $Bi_2O_3$ | 0–2% and/or |
| $TeO_2$ | 0–5% and/or |
| $Ga_2O_3$ | 0–1%. |

$SiO_2$ is an indispensable component which is very effective for increasing viscosity of the glass and improving resistance to devitrification and chemical durability of the glass. If, however, the amount of this component is insufficient, these effects cannot be achieved sufficiently whereas if the amount of this component is excessively large, the glass transition temperature (Tg) rises and the melting property of the glass is deteriorated. Therefore, the lower limit of the amount of this component should preferably be 10%, more preferably 10.5% and, most preferably be 11% and the upper limit of the amount of this component should be 40%, more preferably 35% and, most preferably be 30%.

In the optical glass of the present invention which is a lanthanum glass, $B_2O_3$ is an indispensable component as a glass forming oxide. If, however, the amount of this component is insufficient, resistance to devitrification becomes insufficient whereas if the amount of this component excessively large, refractive index becomes low to the degree that it will deviate from the target optical constants and chemical durability is also deteriorated. Therefore, the lower limit of the amount of this component should preferably be 8%, more preferably 11% and, most preferably be 15% and the upper limit of this component should preferably be 40%, more preferably less than 36% and, most preferably be 32%.

$Y_2O_3$ is an indispensable component for realizing a light weight in the glass of the present invention which has high refractive-low dispersion characteristics, for it is effective for increasing refractive index and realizing low dispersion. If, however the amount of this component is insufficient, it becomes difficult to maintain the optical constants within the above described ranges whereas if the amount of this component excessively large, resistance to devitrification is deteriorated. Therefore, the lower limit of the amount of this component should preferably be more than 2%, more preferably 3% and, most preferably be 4% and the upper limit of the amount of this component should be 18%, more preferably 15% and, most preferably be 13%.

$La_2O_3$ is an indispensable component which is effective for increasing refractive index and lowering dispersion. If, however, the amount of this component is insufficient, it is difficult to maintain the optical constants within the above described values whereas if the amount of this component is excessively large, resistance to devitrification is deteriorated. Therefore, the lower limit of the amount of this component should preferably be 3%, more preferably 4.5% and, most preferably be 6% and the upper limit of the amount of this component should preferably be 16%, more preferably 15% and, most preferably be 13%.

ZnO is an indispensable component which is effective for lowering the glass transition temperature (Tg). If, however, the amount of this component is insufficient, this effect cannot be achieved sufficiently whereas if the amount of this component is excessively large, resistance to devitrification is deteriorated. Therefore, lower limit of the amount of this component should preferably be 7%, more preferably 11% and, most preferably be 15% and the upper limit of the amount of this component should preferably be less than 35%, more preferably 31% and, most preferably be 28%.

$Li_2O$ is an indispensable component which is effective for lowering the glass transition temperature (Tg) substantially and facilitating melting of mixed glass materials. If, however, the amount of this component is insufficient, these effects cannot be achieved sufficiently whereas if the amount of this component is excessively large, resistance to devitrification is sharply deteriorated. Therefore, the lower limit of the amount of this component should preferably be 4%, more preferably be 6% and most preferably be 8% and the upper limit of the amount of this component should preferably be 24%, more preferably 20% and, most preferably be 16%.

$Gd_2O_3$ is effective for increasing refractive index and lowering dispersion. If, however, the amount of this component is excessively large, resistance to devitrification and chemical durability are deteriorated. Therefore, the upper limit of the amount of this component should preferably be 7%, and more preferably be 1%, and most preferably, this component should not be substantially added.

$Yb_2O_3$ is effective for increasing refractive index and lowering dispersion. If, however, the amount of this component is excessively large, resistance to devitrification and chemical durability are deteriorated. Therefore, the upper limit of the amount of this component should preferably be 7%, more preferably 4% and, most preferably, be 2%.

$ZrO_2$ is effective for adjusting optical constants, improving resistance to devitrification and improving chemical durability. If, however, the amount of this component is excessively large, resistance to devitrification is deteriorated and it becomes difficult to maintain the glass transition temperature (Tg) at a desired low temperature. Therefore, the upper limit of the amount of this component should preferably be 10%, more preferably 6% and, most preferably be 5%.

$Ta_2O_5$ is effective for increasing refractive index and, improving chemical durability and resistance to devitrification. If, however, the amount of this component is excessively large, it becomes difficult to maintain the above described optical constants. Therefore, the upper limit of the amount of this component should preferably be 2%, more preferably 1.5% and, most preferably be 1%.

$WO_3$ is effective for adjusting optical constants and improving resistance to devitrification. If, however, the amount of this component is excessively large, resistance to devitrification and transmittance in the short wavelength region of the visible ray region are deteriorated. Therefore, the upper limit of the amount of this component should preferably be 3%, more preferably 2% and, most preferably, be 1%.

$Sb_2O_3$ may be optionally added for defoaming during melting of the glass. If the amount of this component is excessive, transmittance in the short-wave region of the visible ray region is deteriorated. Therefore, the upper limit of the amount of this component should preferably be 1%, more preferably 0.5% and, most preferably, be 0.1%.

$TiO_2$ is effective for adjusting optical constants and improving resistance to devitrification. If, however, the amount of this component is excessively large, resistance to devitrification decreases rather than increases and transmittance in the short-wave region of the visible ray region is deteriorated. Therefore the upper limit of the amount of this component should preferably be less than 3%, more preferably 2% and, most preferably be less than 1%.

$Nb_2O_5$ is effective for increasing refractive index and improving chemical durability and resistance to devitrification. If, however, the amount of this component is excessively large, resistance to devitrification decreases rather than increases and transmittance in the short-wave region of the visible ray region is deteriorated. Therefore, the upper limit of the amount of this component should preferably be 2%, more preferably 1.5% and, most preferably, be 1%.

$Bi_2O_3$ is effective for increasing refractive index. If, however, the amount of this component is excessively large, resistance to devitrification tends to decreases. Therefore, the upper limit of the amount of this component should preferably be less than 3%, more preferably 2% and, most preferably, be 1%.

$Na_2O$ is effective for lowering glass transition temperature (Tg). If, however, the amount of this component is excessively large, resistance to devitrification tends to decreases. Therefore, the upper limit of the amount of this component should preferably be 10%, more preferably 5% and, most preferably, be 3%.

$K_2O$ is effective for lowering glass transition temperature (Tg). If, however, the amount of this component is excessively large, resistance to devitrification tends to decreases. Therefore, the upper limit of the amount of this component should preferably be 10%, more preferably 5% and, most preferably, be 3%.

MgO is effective for adjusting optical constants. If, however, the amount of this component is excessively large, resistance to devitrification tends to decrease. Therefore, the upper limit of the amount of this component should preferably be 5%, more preferably 3% and, most preferably, be 1%.

CaO is effective for adjusting optical constants. If, however, the amount of this component is excessively large, resistance to devitrification tends to decrease. Therefore, the upper limit of the amount of this component should preferably be 10%, more preferably 8% and, most preferably, be 5%.

SrO is effective for adjusting optical constants. If, however, the amount of this component is excessively large, resistance to devitrification tends to decrease. Therefore, the upper limit of the amount of this component should preferably be 10%, more preferably 5% and, most preferably, be 3%.

BaO is effective for adjusting optical constants. If, however, the amount of this component is excessively large, resistance to devitrification tends to decrease. Therefore, the upper limit of the amount of this component should preferably be 10%, more preferably 8% and, most preferably, be 5%.

$GeO_2$ is effective for increasing refractive index and improving resistance to devitrification. Since, however, this component is very expensive, the upper limit of the amount of this component should preferably be 3%, more preferably 2% and, most preferably, be 1%.

$Al_2O_3$ is effective for improving chemical durability. If the amount of this component is excessively large, resistance to devitrification is deteriorated. Therefore, the upper limit of this component should preferably be 5%, more preferably 3% and, most preferably, be 1%.

$TeO_2$ is effective for increasing refractive index but there is likelihood that, when glass materials are melted in a platinum crucible or a melting furnace which is formed with platinum in a portion which comes into contact with molten glass, tellurium of $TeO_2$ is alloyed with platinum and heat resisting property of the alloyed portion is deteriorated with resulting making of a hole in the alloyed portion and leakage of the molten glass from the hole. The upper limit of the amount of $TeO_2$ therefore should preferably be 5%, more preferably 4% and, most preferably, be 3%.

$Ga_2O_3$ is effective for increasing refractive index. Since, however, this component is very expensive, the upper limit of the amount of this component should preferably be 1%, more preferably 0.5% and, most preferably, be 0.1%.

Description will now be made about the properties of the optical glass of the present invention.

As described above, the optical glass of the present invention should preferably have, from the standpoint of utility in the optical design, optical constants of a refractive index (nd) within a range from 1.73 to less than 1.80 and an Abbe number (vd) within a range from 43 to 55, more preferably a refractive index (nd) within a range from 1.74 to less than 1.795 and an Abbe number (vd) within a range from 44 to less than 50 and, most preferably, a refractive index (nd) within a range from 1.75 to less than 1.795 and an Abbe number (vd) within a range from 45 to less than 50.

In the optical glass of the present invention, an excessively high Tg tends to cause, as described previously, deterioration in the mold in conducting precision press molding. In the optical glass of the present invention, therefore, the upper limit of Tg should preferably be 620° C., more preferably 570° C. and, most preferably, be 550° C.

Yield point At should preferably be 670° C. or below, more preferably 620° C. or below and, most preferably be 600° C. or below.

In the optical glass of the present invention, with a view to making an optical system mounted on an optical product compact and light, it is important that specific gravity should preferably be 4.5 or below, more preferably be less than 4.5 and, most preferably, be 4.4 or below.

In the optical glass of the present invention, for forming flowing-out glass at viscosity within a proper range, it is important to maintain liquidus temperature of the glass below 1160° C. or below. A preferable liquidus temperature is 1150° C. or below and particularly preferable liquidus temperature is less than 1150° C., because, at this liquidus temperature, the range of viscosity which enables a stable production is broadened and the melting temperature of the glass is lowered and energy consumption thereby can be reduced.

The liquidus temperature means the lowest temperature at which no crystal is observed when crushed glass specimen is put on a platinum plate, held in a furnace with temperature graduations for 30 minutes and thereafter is taken out of the furnace and, after cooling, presence or absence of crystals in the softened glass is observed with a microscope.

As described previously, the optical glass of the present invention can be used as a preform for precision press molding. In a case where it is used as a preform, the method for manufacturing the preform and the manner of precision press molding are not particularly limited but known manufacturing method and known precision press molding method can be used. For example, a preform can be manufactured directly from molten glass or, alternatively, a preform can be manufactured by cold processing sheet glass.

In a case where a preform is made by dripping molten glass by using the optical glass of the present invention, if viscosity of the molten glass is too low, striae tends to occur in the preform whereas if viscosity is too high, cutting of glass by weight and surface tension of dripping glass becomes difficult.

Accordingly, for producing a high-quality preform stably, logarithm log η of viscosity (Pa·s) should preferably be within a range from 0.3 to 2.0, more preferably within a range from 0.4 to 1.8 and, most preferably be within a range exceeding 0.4 up to 1.6.

EXAMPLES

Examples of the present invention will now be described, though the present invention in no way is limited by these examples.

Tables 1 to 4 show compositions of Example No. 1 to No. 21 of the optical glass of the present invention together with their refractive index (nd), Abbe number (vd), glass transition temperature (Tg), specific gravity and liquidus temperature. As to Example No. 16 to No. 21, devitrification in appearance is shown together with their refractive index (nd), Abbe number (vd), glass transition temperature (Tg), specific gravity and liquidus temperature. In the tables, composition of the respective components are expressed in mass %.

Table 5 shows compositions of optical glasses of Comparative Examples A and B together with their refractive index (nd), Abbe number (vd), glass transition temperature (Tg), specific gravity, liquidus temperature and devitrification in appearance.

TABLE 1

| | Examples | | | | |
|---|---|---|---|---|---|
| | 1 | 2 | 3 | 4 | 5 |
| $SiO_2$ | 8.99 | 8.82 | 8.82 | 8.78 | 8.78 |
| $B_2O_3$ | 16.46 | 16.16 | 16.16 | 16.08 | 17.01 |
| $Y_2O_3$ | 18.92 | 18.57 | 18.57 | 18.48 | 18.48 |
| $La_2O_3$ | 30.84 | 31.24 | 30.24 | 30.10 | 30.18 |
| $Gd_2O_3$ | 0.00 | 0.00 | 0.00 | 0.00 | 0.00 |
| $Yb_2O_3$ | 0.00 | 0.00 | 0.00 | 0.00 | 0.00 |
| $ZrO_2$ | 2.65 | 2.60 | 2.60 | 2.59 | 2.59 |
| $Ta_2O_5$ | 2.89 | 3.71 | 2.86 | 2.85 | 3.70 |
| $WO_3$ | 0.00 | 0.00 | 1.86 | 1.85 | 0.00 |
| ZnO | 16.84 | 16.53 | 16.53 | 16.45 | 16.45 |
| $Li_2O$ | 2.37 | 2.32 | 2.32 | 2.77 | 2.77 |
| $Sb_2O_3$ | 0.05 | 0.05 | 0.05 | 0.05 | 0.05 |
| Total(%) | 100.00 | 100.00 | 100.00 | 100.00 | 100.00 |
| $SiO_2/B_2O_3$ | 0.55 | 0.55 | 0.55 | 0.55 | 0.52 |
| $Y_2O_3/La_2O_3$ | 0.61 | 0.59 | 0.61 | 0.61 | 0.61 |
| nd | 1.77669 | 1.78044 | 1.78091 | 1.77841 | 1.77284 |
| Nd | 47.4 | 46.9 | 46.6 | 46.5 | 47.3 |
| Tg (° C.) | 547 | 550 | 550 | 538 | 536 |
| Specific gravity | 4.31 | 4.36 | 4.35 | 4.33 | 4.30 |
| Liquidus temperature (° C.) | 1149 | 1149 | 1148 | 1148 | 1145 |

TABLE 2

| | Examples | | | | |
|---|---|---|---|---|---|
| | 6 | 7 | 8 | 9 | 10 |
| $SiO_2$ | 11.55 | 11.50 | 11.61 | 11.50 | 11.50 |
| $B_2O_3$ | 14.23 | 14.17 | 14.30 | 14.17 | 14.17 |
| $Y_2O_3$ | 18.48 | 18.40 | 18.57 | 21.16 | 12.88 |
| $La_2O_3$ | 30.18 | 30.04 | 30.32 | 27.28 | 35.56 |
| $Gd_2O_3$ | 0.00 | 0.00 | 0.00 | 0.00 | 0.00 |
| $Yb_2O_3$ | 0.00 | 0.00 | 0.00 | 0.00 | 0.00 |
| $ZrO_2$ | 2.59 | 2.58 | 2.60 | 2.58 | 2.58 |
| $Ta_2O_5$ | 3.70 | 3.68 | 2.79 | 3.68 | 3.68 |
| $WO_3$ | 0.00 | 0.00 | 0.00 | 0.00 | 0.00 |
| ZnO | 16.45 | 16.38 | 16.53 | 16.38 | 16.38 |
| $Li_2O$ | 2.77 | 3.22 | 3.25 | 3.22 | 3.22 |
| $Sb_2O_3$ | 0.05 | 0.05 | 0.05 | 0.05 | 0.05 |
| Total(%) | 100.00 | 100.00 | 100.00 | 100.00 | 100.00 |
| $SiO_2/B_2O_3$ | 0.81 | 0.81 | 0.81 | 0.81 | 0.81 |
| $Y_2O_3/La_2O_3$ | 0.61 | 0.61 | 0.61 | 0.78 | 0.36 |
| nd | 1.77413 | 1.77195 | 1.77009 | 1.77166 | 1.77302 |
| Nd | 47 | 47.1 | 47.2 | 47 | 47.1 |

TABLE 2-continued

| | Examples | | | | |
|---|---|---|---|---|---|
| | 6 | 7 | 8 | 9 | 10 |
| Tg (° C.) | 538 | 536 | 535 | 537 | 535 |
| Specific gravity | 4.30 | 4.28 | 4.26 | 4.25 | 4.35 |
| Liquidus temperature (° C.) | 1121 | 1122 | 1134 | 1147 | 1107 |

TABLE 3

| | Examples | | | | |
|---|---|---|---|---|---|
| | 11 | 12 | 13 | 14 | 15 |
| $SiO_2$ | 11.50 | 11.45 | 11.55 | 11.66 | 11.72 |
| $B_2O_3$ | 14.17 | 13.74 | 13.86 | 13.99 | 14.06 |
| $Y_2O_3$ | 10.12 | 15.57 | 15.71 | 15.86 | 15.93 |
| $La_2O_3$ | 38.32 | 33.01 | 33.32 | 33.63 | 33.79 |
| $Gd_2O_3$ | 0.00 | 0.00 | 0.00 | 0.00 | 0.00 |
| $Yb_2O_3$ | 0.00 | 0.00 | 0.00 | 0.00 | 0.00 |
| $ZrO_2$ | 2.58 | 2.56 | 2.59 | 2.61 | 2.62 |
| $Ta_2O_5$ | 3.68 | 3.66 | 2.77 | 1.87 | 1.87 |
| $WO_3$ | 0.00 | 0.00 | 0.00 | 0.00 | 0.00 |
| ZnO | 16.38 | 16.30 | 16.45 | 16.60 | 16.68 |
| $Li_2O$ | 3.22 | 3.66 | 3.70 | 3.73 | 3.28 |
| $Sb_2O_3$ | 0.05 | 0.05 | 0.05 | 0.05 | 0.05 |
| Total(%) | 100.00 | 100.00 | 100.00 | 100.00 | 100.00 |
| $SiO_2/B_2O_3$ | 0.81 | 0.83 | 0.83 | 0.83 | 0.83 |
| $Y_2O_3/La_2O_3$ | 0.26 | 0.47 | 0.47 | 0.47 | 0.47 |
| nd | 1.77351 | 1.77228 | 1.77034 | 1.76845 | 1.77079 |
| Nd | 46.9 | 46.8 | 47.1 | 47.3 | 47.4 |
| Tg (° C.) | 536 | 529 | 528 | 528 | 538 |
| Specific gravity | 4.39 | 4.32 | 4.29 | 4.27 | 4.28 |
| Liquidus temperature (° C.) | 1119 | 1132 | 1119 | 1120 | 1108 |

TABLE 4

| | Examples | | | | | |
|---|---|---|---|---|---|---|
| | 16 | 17 | 18 | 19 | 20 | 21 |
| $SiO_2$ | 7.36 | 8.74 | 10.12 | 11.50 | 12.88 | 14.26 |
| $B_2O_3$ | 18.31 | 16.93 | 15.55 | 14.17 | 12.79 | 11.41 |
| $Y_2O_3$ | 15.64 | 15.64 | 15.64 | 15.64 | 15.64 | 15.64 |
| $La_2O_3$ | 32.80 | 32.80 | 32.80 | 32.80 | 32.80 | 32.80 |
| $Gd_2O_3$ | 0.00 | 0.00 | 0.00 | 0.00 | 0.00 | 0.00 |
| $Yb_2O_3$ | 0.00 | 0.00 | 0.00 | 0.00 | 0.00 | 0.00 |
| $ZrO_2$ | 2.58 | 2.58 | 2.58 | 2.58 | 2.58 | 2.58 |
| $Ta_2O_5$ | 3.68 | 3.68 | 3.68 | 3.68 | 3.68 | 3.68 |
| $WO_3$ | 0.00 | 0.00 | 0.00 | 0.00 | 0.00 | 0.00 |
| ZnO | 16.38 | 16.38 | 16.38 | 16.38 | 16.38 | 16.38 |
| $Li_2O$ | 3.22 | 3.22 | 3.22 | 3.22 | 3.22 | 3.22 |
| $Sb_2O_3$ | 0.05 | 0.05 | 0.05 | 0.05 | 0.05 | 0.05 |
| Total(%) | 100.00 | 100.00 | 100.00 | 100.00 | 100.00 | 100.00 |
| $SiO_2/B_2O_3$ | 0.40 | 0.52 | 0.65 | 0.81 | 1.01 | 1.25 |
| $Y_2O_3/La_2O_3$ | 0.48 | 0.48 | 0.48 | 0.48 | 0.48 | 0.48 |
| nd | 1.77181 | 1.77195 | 1.77201 | 1.77246 | 1.77334 | 1.77415 |
| Nd | 47.3 | 47.3 | 47.1 | 47 | 46.8 | 46.6 |
| Tg (° C.) | 534 | 536 | 535 | 536 | 536 | 538 |
| Specific Gravity | 4.31 | 4.31 | 4.31 | 4.31 | 4.32 | 4.32 |
| Liquidus temperature (° C.) | 1054 | 1041 | 1083 | 1108 | 1119 | 1144 |
| Devitrification in appearance | Δ | Δ | Δ | Δ | ○ | ○ |

TABLE 5

|  | Comparative Examples | |
|---|---|---|
|  | A | B |
| $SiO_2$ | 5.79 | 15.64 |
| $B_2O_3$ | 19.88 | 10.03 |
| $Y_2O_3$ | 4.64 | 4.64 |
| $La_2O_3$ | 32.80 | 32.80 |
| $Gd_2O_3$ | 11.00 | 11.00 |
| $Yb_2O_3$ | 0.00 | 0.00 |
| $ZrO_2$ | 2.58 | 2.58 |
| $Ta_2O_5$ | 3.68 | 3.68 |
| $WO_3$ | 0.00 | 0.00 |
| ZnO | 16.38 | 16.38 |
| $Li_2O$ | 3.22 | 3.22 |
| $Sb_2O_3$ | 0.05 | 0.05 |
| Total(%) | 100.00 | 100.00 |
| $SiO_2/B_2O_3$ | 0.29 | 1.56 |
| $Y_2O_3/La_2O_3$ | 0.14 | 0.14 |
| nd | 1.77155 | 1.77484 |
| Nd | 47.4 | 46.5 |
| Tg | 534 | 537 |
| Specific Gravity | 4.51 | 4.53 |
| Liquidus temperature(° C.) | 1060 | 1175 |
| Devitrification in appearance | X | O |

For manufacturing the glasses of Example No. 1 to No. 21 shown in Tables 1 to 4, ordinary raw materials for an optical glass including oxides, carbonates and nitrates were weighed and mixed so as to realize the composition ratio of the respective examples shown in Tables 1 to 4. The raw materials were put in a platinum crucible and melted at a temperature within a range from 1100° C. to 1400° C. for three to five hours depending upon the melting property of the composition. After refining and stirring the melt for homogenization, the melt was cast into a mold and annealed to provide the glasses.

Refractive index (nd) and Abbe number (vd) of the glasses were measured with respect to glasses which were obtained by setting the rate of lowering of annealing temperature at −25° C./Hr.

Glass transition temperature (Tg) of the glasses was measured in accordance with the Japan Optical Glass Industrial Standard JOGIS08$^{-2003}$ "Measuring Method of Thermal Expansion of Optical Glass". A specimen having length of 50 mm and diameter of 4 mm was used as a test specimen.

Specific gravity of the glasses was measured in accordance with the Japan Optical Glass Industrial Standard JOGIS-05$^{-1975}$ "Measuring Method of Specific Gravity of Optical Glass".

Devitrification in appearance was measured with eye. In the table, the mark O indicates state where no devitrification is observed on the surface of the glass, the mark Δ indicates state where devitrification is observed only on the uppermost surface of the glass and the mark X indicates state where devitrification is observed in a portion from the surface into the interior of the glass.

As shown in Tables 1 to 4, the optical glasses of Example No. 1 to No. 21 all have the optical constants (refractive index (nd) and Abbe number (vd) of the above described ranges and their glass transition temperature (Tg) is 620° C. or below and, therefore, they are suitable for precision press molding. Further, since the specific gravity of these examples is within a range from 4.25 to 4.39, they are effective for a light weight design of an optical system. Since the optical glasses of Table 4 (Example No. 16 to No. 21) have the ratio of $SiO_2/B_2O_3$ within a range from 0.40 to 1.25 and the ratio of $Y_2O_3/La_2O_3$ within a range from 0.26 to 0.78, liquidus temperature of these optical glasses is within a range from 1041° C. to 1144° C. and vitrification does not occur on the surface of the glass or, even if vitrification occurs, it is limited to the uppermost surface of the glass and, therefore, devitrification is controlled to such a degree that these optical glasses can be used for commercial purposes.

On the other hand, the specimens of Comparative Examples A and B shown in Table 5 were manufactured under the same conditions as the examples of the present invention were manufactured and the manufactured glasses were evaluated by the same evaluation methods as used for evaluating the examples of the present invention. In Comparative Examples A and B, the ratio of $Si_2O/B_2O_3$ is outside of the range from 0.30 to 1.55 and the ratio of $Y_2O_3/La_2O_3$ is outside of the range from 0.15 to 1.00 and, therefore, liquidus temperature and devitrification in appearance are not compatible with each other. For this reason, these optical glasses cannot be used for commercial purposes.

INDUSTRIAL APPLICABILITY

As described above, the optical glass of the present invention which is of a $SiO_2$—$B_2O_3$—$Y_2O_3$—$La_2O_3$—ZnO—$Li_2O$ glass is free of Pb, As and F and has optical constants of a refractive index (nd) within a range from 1.73 to less than 1.80 and an Abbe number (vd) within a range from 43 to 55 and glass transition temperature (Tg) of 620° C. or below and hence is suitable for precision press molding and has sufficient industrial utility.

What is claimed is:
1. An optical glass, comprising in mass %

| $SiO_2$ | more than 5% and 20% or below, |
|---|---|
| $B_2O_3$ | 5% to less than 20%, |
| $Y_2O_3$ | more than 5% and 35% or below, |
| $La_2O_3$ | 10-50%, |
| ZnO | around 5% to less than 25%, and |
| $Li_2O$ | more than 1% and 6% or below, | wherein a ratio of $SiO_2/B_2O_3$ is 0.30 to 1.55 and a ratio of $Y_2O_3/La_2O_3$ is 0.15 to 1.00, wherein the optical glass is substantially free of lead component, arsenic component and fluorine component, wherein the optical glass has a glass transition temperature (Tg) of 620° C. or below, optical constants of a refractive index (nd) within a range from 1.73 to less than 1.80 and an Abbe number (vd) within a range from 43 to 55.

2. The optical glass as defined in claim 1 which has a glass transition temperature (Tg) of 570° C. or below.

3. The optical glass as defined in claim 1 which has specific gravity of 4.5 or below.

4. The optical glass as defined in claim 1, further comprising in mass % on oxide basis: one or more selected from the group consisting of

| $Na_2O$ | 0–5% and/or |
|---|---|
| $K_2O$ | 0–5% and/or |
| MgO | 0–5% and/or |
| CaO | 0–less than 15% and/or |
| SrO | 0–10% and/or |
| BaO | 0–15% and/or |
| $GeO_2$ | 0–5% and/or |
| $Al_2O_3$ | 0–5% and/or |
| $TiO_2$ | 0–less than 3% and/or |

-continued

| | |
|---|---|
| $Nb_2O_5$ | 0–less than 3% and/or |
| $Bi_2O_3$ | 0–less than 10%. |

5. The optical glass as defined in claim 1 having liquidus temperature of 1160° C. or below and log η which is logarithm of viscosity (dPa·s) at liquidus temperature is within a range from 0.3 to 2.0.

6. The optical glass as defined in claim 1, further comprising in mass % on oxide basis: one or more selected from the group consisting of

| | |
|---|---|
| $Gd_2O_3$ | 0-1%, |
| $Yb_2O_3$ | 0-20%, |
| $ZrO_2$ | 0-10%, |
| $Ta_2O_5$ | 0-less than 8%, |
| $WO_3$ | 0-less than 5.5%, and |
| $Sb_2O_3$ | 0-1%. |

7. An optical glass comprising in mass % on oxide basis:

| | |
|---|---|
| $SiO_2$ | more than 5% and 20% or below, |
| $B_2O_3$ | 5% to less than 20%, |
| $Y_2O_3$ | more than 5% and 35% or below, |
| $La_2O_3$ | 10-50%, |
| ZnO | around 12% to less than 25%, |
| $Li_2O$ | more than 1% and 6% or below, and | one or more compounds selected from the group consisting of

| | |
|---|---|
| $Gd_2O_3$ | 0 to 1%, |
| $Yb_2O_3$ | 0-20%, |
| $ZrO_2$ | 0-10%, |
| $Ta_2O_5$ | 0-less than 8%, |
| $WO_3$ | 0-less than 5.5%, and |
| $Sb_2O_3$ | 0-1%. |

8. The optical glass as defined in any of claims 1-4, 6-7, wherein the optical glass is included in a lens preform.

9. The optical glass as defined in claim 8, wherein the optical glass is included in an optical element made by precision press molding of the lens preform.

10. The optical glass as defined in any of claims 1-4, 6-7, wherein the optical glass is included in an optical element made by precision press molding.

* * * * *